United States Patent

[11] 3,601,413

| [72] | Inventor | James R. Darnell<br>Dallas, Tex. |
|---|---|---|
| [21] | Appl. No. | 842,872 |
| [22] | Filed | July 18, 1969 |
| [45] | Patented | Aug. 24, 1971 |
| [73] | Assignee | Texas Instruments Incorporated<br>Dallas, Tex. |

[54] MECHANICAL SEAL
3 Claims, 3 Drawing Figs.

| [52] | U.S. Cl. | 277/96 |
|---|---|---|
| [51] | Int. Cl. | F16j 15/34 |
| [50] | Field of Search | 277/96, 208, 227, 235 A, 237 MD; 117/106 C; 308/187 |

[56] References Cited
UNITED STATES PATENTS

| 3,011,912 | 12/1961 | Gareis et al. | 117/106 C |
| 3,368,914 | 2/1968 | Darnell et al. | 117/106 C |
| 3,469,851 | 9/1969 | Enemark | 277/96 |

Primary Examiner—Robert I. Smith
Attorneys—Samuel M. Mims, Jr., James O. Dixon, Andrew M. Hassell, Harold Levine, Melvin Sharp, William E. Hiller and John E. Vandigriff ABSTRACT: A mechanical seal includes a sealing surface formed by chemical vapor deposition of an extremely hard material, such as silicon carbide. The surface is finished to the required smoothness by optical grinding. The resulting seal has excellent wear resistance as well as high tolerance to corrosive chemicals, extreme temperatures and other adverse operating conditions.

PATENTED AUG 24 1971 3,601,413

INVENTOR
JAMES R. DARNELL

3,601,413

MECHANICAL SEAL

BACKGROUND OF THE INVENTION

Mechanical seals usually include a seat and a washer that cooperates with the seat to form the seal. Typically, the seat is mounted in a housing or other stationary member and the washer is fixed to a rotating shaft. The seat and washer include mating surfaces which engage each other to form a seal between the shaft and the housing.

In the past, the seats and washers of mechanical seals have been formed from such materials as sintered tungsten carbide, ceramics such as aluminum oxide, graphite and carbon, bronze, stainless steel, stellite, etc. To prevent galling, the mating surfaces of the two parts are usually made unequal in hardness Often, one of the parts is formed from a self-lubricating material while the cooperating part is formed from a wear resistant material.

The use of mechanical seals including seats and washers formed from the materials that have been available heretofore results in several problems. For example, should a piece of grit or other foreign material come between the mating surfaces of the seat and the washer, the mating surfaces wear unevenly. Uneven wear between the mating surfaces causes the seal to leak. Even if foreign material does not get between the mating surfaces, the seat and washer wear away relatively rapidly so that at least one of the parts must be replaced. This is especially true when one of the parts is formed from a soft material. Other problems involve temperature and strength limitations, chemical resistance limitations, etc. that are inherent in the materials presently used to form mechanical seal parts.

This invention relates to a mechanical seal in which the mating surface of either the seat or the washer is formed by chemical vapor deposition. Surfaces formed by this technique have several characteristics that are highly desirable in mechanical seals. For example, by properly selecting the material to be deposited and by controlling the deposition process, the surface can be made extremely hard and dense and thus highly resistant to wear. Many materials formed by chemical vapor deposition exhibit high thermal conductivity which also contributes to wear resistance. And, unlike sintered materials that often include binders which are subject to chemical attack, high-temperature breakdown and the like, chemical vapor deposition results in a pure material. Thus, by properly selecting the material to be deposited, mechanical seal components formed by chemical vapor deposition can be made resistant to any desired chemical to high temperatures, etc.

SUMMARY OF THE INVENTION

This invention comprises a mechanical seal in which at least one of the sealing faces is formed by chemical vapor deposition. In one embodiment, the surface is formed by depositing silicon carbide on a preformed graphite ring. In another embodiment, one of the components of the seal is formed entirely from deposited silicon carbide.

DESCRIPTION OF THE DRAWING

A more complete understanding of the invention may be had by referring to the following detailed description when taken in conjunction with the drawing, wherein.

DETAILED DESCRIPTION

Figure 1:
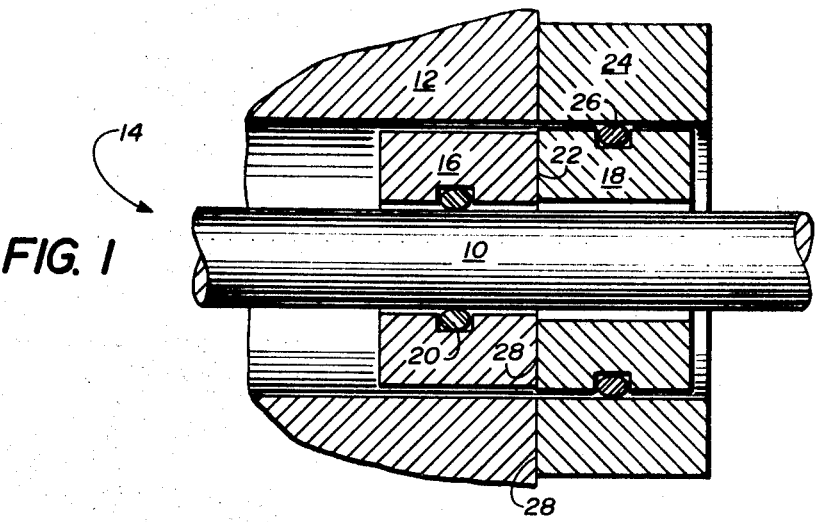
FIG. 1 is a schematic illustration of the operation of a mechanical seal.

Referring now to the drawing and particularly to FIG. 1 thereof, the construction and operation of a mechanical seal is schematically illustrated. A shaft 10 extends into and rotates with respect to a housing 12 which comprises a portion of the housing of a pump, a turbine, or any similar device. A mechanical seal 14 is positioned between the shaft 10 and the housing 12 and operates to prevent fluids from passing into and/or out of the housing 12 at the point of entrance of the shaft 10 into the housing 12.

The mechanical seal 14 includes a sealing washer 16 and a seat 18. The washer 16 is secured and rotates with the shaft 10. An O-ring 20 forms a seal between the washer 16 and the shaft 10. The washer 16 has a flat, ring-shaped sealing face 22.

The seat 18 is secured to a cap 24 which is in turn fixed to the housing 12. An O-ring 26 forms a seal between the seat 18 and the cap 24. The seat 18 has a flat, ring-shaped sealing surface 28.

In use, the washer 16 is normally spring loaded or otherwise urged tightly into engagement with the seat 18. The O-ring 16 prevents fluids from flowing into and/or out of the housing 12 along the gap between the mechanical seal 14 and the shaft 10. Similarly, the O-ring 26 prevents fluids from flowing into and/or out of the housing 12 along a gap between the mechanical seal 14 and the housing 12.

Interengagement of the flat, ring-shaped surfaces 22 and 28 of the washer 16 and the seat 18, respectively, prevents fluids from flowing into and/or out of the housing 12 across the mechanical seal 14. That is, the sealing surfaces 22 and 28 operate to prevent fluids from flowing along a path extending between the mechanical seal 14 and the housing 12, between the washer 16 and seat 18 and between the seat 18 and the shaft 10. Of course, during rotation of the shaft 10 in the housing 12, the sealing surfaces 22 and 28 rotate with respect to each other.

In the past, it has been common to form one of the sealing parts of a mechanical seal, for example, the seat, from a hard, wear-resistant material such as sintered tungsten carbide, aluminum oxide, or stainless steel. The other sealing part is typically formed from a relatively soft material such as carbon or graphite. In accordance with this invention, at least the sealing face of at least one of the sealing parts is formed by chemical vapor deposition.

Surfaces formed by chemical vapor deposition exhibit several properties that are highly desirable in the sealing surfaces of mechanical seals. For example, chemical vapor deposition results in a surface that is highly dense, approaching its theoretical value. Thus, when such a surface is subjected to wear, a great bulk of material must be worn away before any substantial change in the surface occurs. Second, many materials exhibit exceptional thermal conductivity when formed by chemical vapor deposition. This property, when combined with the dense nature of the surface, results in a surface that is extremely resistant to wear, especially when the material deposited is a hard material by nature.

In the preferred embodiment, a mechanical seal includes a washer and a seat both of which are formed entirely by chemical vapor deposition Although any desired material may be used, it has been found that washers and seats formed from chemical vapor deposited silicon carbide exhibit excellent properties when employed in mechanical seals. Silicon carbide is an extremely hard material, is highly resistent to chemical attack, and is virtually uneffected by extremes in temperature.

Figure 2:
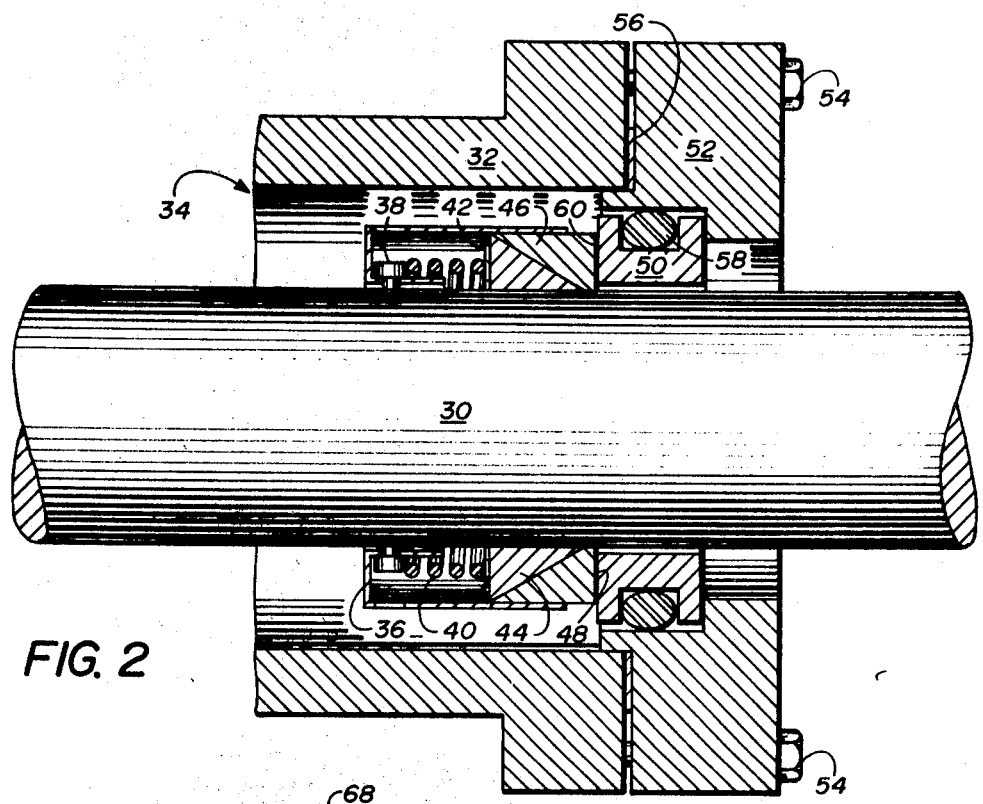
FIG. 2 is an enlarged longitudinal sectional view of a mechanical seal employing the invention.

Referring now to FIG. 2, the structural details of a production-type mechanical seal employing the invention are illustrated. Again, a shaft 30 extends into and rotates with respect to a housing 32. A mechanical seal 34 is positioned between the shaft 30 and the housing 32 and operates to prevent the movement of fluids into and/or out of the housing 32 at the point of entrance of the shaft 30 into the housing 32.

The mechanical seal 34 includes a housing 36 which is secured to the shaft 30 by a plurality of bolts 38. A coil spring 40 is positioned within the housing 36 and is compressed between the bolts 38 and a washer 42. The spring 40 drives the washer 42 into engagement with a sealing wedge 44 which in turn engages a sealing washer 46. The washer 46 has a sealing face 48.

A seat 50 is mounted in a cap 52. The cap 52 is secured to the housing 32 by a plurality of bolts 54. A gasket 56 forms a seal between the cap 52 and the housing 32 and an O-ring 58 forms a seal between the seat 50 and the cap 52. The seat 50 has a sealing face 60 positioned in engagement with the face 48 of the sealing washer 46.

In use, the spring 40 drives the wedge 44 into sealing engagement with the shaft 30 and drives the face 48 of the sealing washer 46 into engagement with the face 60 of the seat 50. The wedge 44 prevents leakage between the mechanical seal 34 and the shaft 30. Engagement of the faces 48 and 60 under the action of the spring 40 prevents leakage across the seal 34. The gasket 56 and the O-ring 58 cooperate to prevent leakage between the seal 34 and the housing 32 and the cap 52.

The housing 36, the bolts 38, the spring 40 and the washer 42 of the seal 34 may be formed from any convenient material so long as that material is not affected by any fluid contained within the housing 32. For example, the material used to form the shaft 30 may be employed. Likewise, the wedge 44, the gasket 56 and the O-ring 58 may be formed from any convenient material that is resilient enough to form a good seal. For example, soft rubber may be employed so long as the seal 34 is not employed in an environment that is injurious to soft rubber. The sealing washer 46 and the seat 50 are preferably formed by chemical vapor deposition of silicon carbide.

In order to afford a good seal, the sealing faces 48 and 60 of the mechanical seal 34 must be as flat as possible. To this end, after silicon carbide has been chemical vapor deposited to form the washer 46 and the seat 50, the surfaces 48 and 60 are finished by optical grinding techniques. Preferably, the surfaces 48 and 60 are ring-shaped surfaces that have a surface finish of 10 microinches or less and that are flat to within one light band of helium. When surfaces so formed are urged into engagement with each other under the action of the spring 40, leakage across the seal 34 is virtually eliminated.

Figure 3:
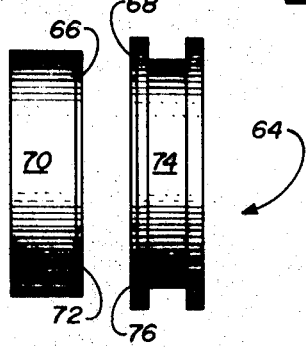
FIG. 3 is an illustration of a second embodiment of the invention.

Referring now to FIG. 3, a second embodiment of the invention is illustrated. A sealing washer 62 and a seat 64 are shaped similarly to the washer 46 and the seat 50 and are suitable for use in the mechanical seal 34 illustrated in FIG. 2. The washer 62 includes a sealing face 66 similar to the face 48 of the washer 46 and the seat 64 includes a sealing face 68 similar to the face 60 of the seat 50.

The washer 62 differs from the washer 46 in that rather than being formed entirely from chemical vapor deposited silicon carbide, the washer 62 is comprised of a graphite blank 70 having a layer of silicon carbide 72 formed on it by chemical vapor deposition. The sealing face 66 is formed on the layer 72 by optical grinding techniques. Similarly, the seat 64 is comprised of a graphite blank 74 having a layer of silicon carbide 76 formed on it by chemical vapor deposition. The sealing surface 68 is formed on the layer 76 by optical grinding techniques.

The use of composite mechanical seal parts such as the washer 62 and the seat 64 illustrated in FIG. 3 is feasible because chemical vapor deposited materials adhere very tightly to substrates upon which they are deposited. Because the sealing faces 66 and 68 of the washer 62 and the seat 64 are formed on chemical vapor deposited silicon carbide layers, the components illustrated in FIG. 3 operate similarly to the components illustrated in FIG. 2 to provide extremely long life sealing parts for use in mechanical seals and the like.

It should be understood that the sealing components for mechanical seals illustrated in FIGS. 2 and 3 can be employed with cooperating mechanical seal parts formed from materials other than chemical vapor deposited materials, if desired. Material suitable for use in forming seal parts to be employed with parts formed by chemical vapor deposition include stellite, stainless steel and carburized tool steel. For example, when a washer formed as illustrated in FIG. 3 was employed in conjunction with a carbonized tool steel seat, an increase in the seal life of approximately 50 percent was noted as compared with a similar seal employed with a stellite washer.

Although only two embodiments of the invention are illustrated in the accompanying drawing and described herein, it will be understood that the invention is not limited to the embodiments disclosed but is capable of rearrangement, substitution and modification of parts and elements without departing from the spirit of the invention.

What I claim is:

1. A mechanical seal comprising:
    a first sealing member including a hard, wear-resistant silicon carbide sealing surface formed by chemical vapor deposition, and
    a second sealing member mounted for rotation relative to the first sealing member and including a sealing surface mounted in engagement with the sealing surface of the first sealing member.

2. The mechanical seal according to claim 1 wherein the first sealing member includes an annular body of said chemical vapor deposited silicon carbide having a flat, ring-shaped sealing surface formed on it.

3. The mechanical seal according to claim 2 wherein the second sealing member has a flat, ring-shaped sealing surface formed on it that engages the sealing surface of the body of silicon carbide along a ring-shaped line.